Figure 2:
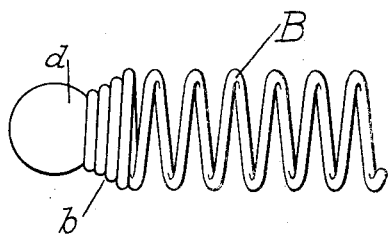

S. SCHOLFIELD.
ILLUSTRATIVE EDUCATIONAL DEVICE.
APPLICATION FILED MAR. 22, 1909.

1,087,186. Patented Feb. 17, 1914.

WITNESSES.
Colin M. Holmes
Chas E. Smith

INVENTOR.
Socrates Scholfield

UNITED STATES PATENT OFFICE.

SOCRATES SCHOLFIELD, OF PROVIDENCE, RHODE ISLAND.

ILLUSTRATIVE EDUCATIONAL DEVICE.

1,087,186.　　　Specification of Letters Patent.　　Patented Feb. 17, 1914.

Application filed March 22, 1909. Serial No. 485,141.

Entered according to act of Congress in the year 1909 by SOCRATES SCHOLFIELD in the office of the Librarian of Congress at Washington, and also copyright 1910 by SOCRATES SCHOLFIELD.

*To all whom it may concern:*

Be it known that I, SOCRATES SCHOLFIELD, a citizen of the United States, residing at Providence, in the State of Rhode Island, have invented a new and useful Illustrative Educational Device, of which the following is a specification.

When teaching natural theology in schools, which is that part of theological science, that treats of those evidences of the existence and attributes of the Supreme Being, that are found in natural science, it is desirable to illustrate certain of these evidences by means of schematic mechanical devices. And with this specific object in view, the schematic device herein shown and described, provides an educational emblem of the idea of a supreme, everlasting conscious sensibility, and is adapted to illustrate certain of its fundamental conditions; but, in order to properly explain the scope of the invention, it will be necessary to first set forth in mechanical terms certain biological and theological doctrines.

The words sensible and sensitive are employed in the terminology of practical mechanics, to characterize those material resilient elements, which, through their quality of automatic reaction, are adapted to indicate the varying conditions of impinging energy. And we may employ the word sensive to specifically denote the sensible and sensitive elements which pertain exclusively to animal sensation. Also, in referring to the parts of those inanimate machines which are adapted for the discriminate dispensation of energy under variable conditions, we may employ the word enginery, to denote that portion of the mechanism in which the energy to be dispensed is embodied, and the words governor, and governing mechanism, to specify that portion which serves to supervise and control the dispensation of the energy to meet the varying requirements. And these terms are in equal degree applicable to the corresponding parts in animal organisms. But in order to provide a term which will denote a distinction between animate and inanimate governing mechanisms, the animate governing mechanism may be called the governing member.

The fabrication of an extensive building or mechanical structure requires the accumulation of the proper building materials at the place of manufacture, together with the employment of a proper number of workmen under the directive control of a supervisor, who is the custodian of, and comprehends the working plans of the proposed organization; and in the absence of supervising control with reference to a special plan of mechanical construction, the workmen—then compelled to act disconnectedly and without knowledge of a specific dimensional specification—would of themselves be entirely incapable of organizing the required extensive and complicated structure from the provided building materials. The human supervisor of the fabrication of an extensive structure, obtains the governing control of the separate independent workmen, by the dispensation to each of them of certain stipulated wages, which are derived from a potential monetary field pertaining to the owner or proprietor of the structure to be fabricated, which field constitutes a conventional embodiment of accumulated energy; and without this supervising dispensation of accumulated energy from the monetary field of the proprietor, or its equivalent, the workmen through lack of material support, would be unable to proceed with the building. Hence we may conclude from analogy that the governing control of the individual protoplasmic cells, for the production of an organic structure, is attained through the mechanical dispensation, to each of the cells, of a form of potential energy which is derived from an external field, and differentiated to the cells in accordance with a representative plan or model of the proposed organization. And the dispensing or promoting supervisor, through the mechanical action of which the required dispensation and differentiation of fabricative energy is effected, has been termed the promoting member of the organism; which promoting member may be considered to be the subconscious self of hypnotism.

Every factory for the production of inanimate fabrics is provided with an owner or proprietor, in accordance with whose will and purpose the fabricative operations are organized and from whom promotive energy for fabrication is derived. Factorial mechanical analogy therefore requires that the terrestrial organic factory, which envelops the earth, and extends from the highest limit of living organisms in the air, to the lowest limit thereof in the sea, with a maximum thickness of about ten miles, also should exist under the control of a proprietor, in accordance with whose will the animate organisms of the factory are constructed, and their fabricative operations governed and regulated. And this governing and regulating proprietor of the terrestrial factory may be termed the proprietor and regulator of energy, and the supreme governor of animate organisms.

We find in every inanimate governing and regulating medium an element having inherent sensibility, an element adapted to prevent the uncontrolled expenditure of the energy, the specific action of which is to be regulated, and an element adapted for the dispensation of the controlled energy in accordance with governmental requirements. Hence there must exist in the supreme governor, inherent sensibility and the power of controlling and dispensing energy in accordance with the specific requirements of the factory. Now in proceeding to determine the inherent moral nature of the supreme governor from the available data of factorial mechanical analogy, we find that in every extensive manufactory for the production of inanimate fabrics, oppositely directed actions are required in the speed-regulating mechanism of the factory, to compensate for the occurring variations of mechanical resistance developed in the fabricative operations,—whereby the desired uniform rate of speed in the fabricative machinery may be maintained. The intelligent helmsman also, holds a ship on its course, or turns it therefrom in either direction, at the command of the governing captain, and opposite actions are absolutely required in all regulating and governing mechanisms, both animate and inanimate.

The natural increase of animal organisms, if unchecked, and subject only to the limitation of old age, would be greater than the coincident increase of the vegetable organisms adapted for animal food; so that life within the terrestrial factory could attain no proper stability without the employment of a negative regulating action, by means of which the superabundant increase of animal life could be economically destroyed. Hence the regulated destruction of animal life is absolutely necessary for the promotion and proper maintenance of the factorial fabricative operations; and for effecting this regulative destruction, pathogenic germs and carnivorous animals in abundant numbers have been provided. And since the fabricative operations of the terrestrial factory require for their fundamental basis the promotion of animal life, the supreme governor of the factory must be able to dispense discriminately the specific energies required, both for the promotion and destruction of life. Factorial mechanical analogy therefore discloses a supreme governor endowed with a promotive energy for beneficent organic fabrication, and a destructive energy for beneficent regulating action, and also endowed with discriminating conscious intelligence.

Now while the beneficent promotive functions constantly performed by the acting beneficent organisms of the factory, imply the attribute of beneficence in the controlling supreme governor, who is the true proprietor of these organisms, and while the destructive functions necessarily performed in the regulation of the terrestrial factory, may also imply the attribute of beneficence—as when a destructive surgical operation is performed for the benefit of the individual operated upon—yet, in many of the organisms of the factory, we find an innate disposition to destructive malicious action, which attribute of malevolence can have no place whatever in the nature of the beneficent supreme governor of our hypothesis. Now, since action and reaction are equal and in opposite directions, the production of any dynamical movement whatever will require a subservient reactive base or fulcrum, which does not partake of the desired movement, but by its inherent reactive nature serves to impart thereto the proper directive quality. Hence we may conclude that the beneficent supreme governor of the terrestrial factory, like every other entity adapted for the dispensation of energy, must employ a subservient reactive medium as the required basis for the outward manifestation of inherent attributes, and that the promotion of beneficence necessarily requires for its subservient reacting base, an adverse medium of maleficence. The emotion of malevolence, which embraces in its nature the wilful injury of others, found inherent in certain organisms of the terrestrial factory will not, therefore, pertain to the nature of the supreme governor, but only to the subservient maleficent medium by means of which the beneficent attribute of the supreme governor is to be dynamically disseminated. And this subservient medium which constitutes the necessary reactive factor for beneficent factoral action may be termed the adverse medium.

The beneficent attributes of the supreme governor and the maleficent attributes of the adverse medium, are exercised in intimate connection, throughout the whole extent of the terrestrial factory. Hence we may reasonably posit that the mutual unceasing opposition which exists between the supreme governor and the co-extensive adverse medium, will serve to maintain in each a true unceasing state of emotive consciousness. The supreme governor and the adverse medium will thus constitute dependently related entities, the development and exercise of the inherent maleficent attributes of the one, being absolutely required for the development and exercise of the inherent beneficent attributes of the other.

It is scientifically maintained that the phenomenon of consciousness in an animal organism, is the result of constantly recurring changes or alternations of state, in an immaterial resilient medium of conscious sensibility, and since the conscious sensibility of an animal organism is completely annihilated in sleep, and is likewise excluded upon interference with the flow of blood in the brain, and does not persist continuously, we may logically conclude that the consciousness of sensation is the result of the impingement of an external energy upon the resilient medium of conscious sensibility in the governing member.

The resilient governing action of a spring is derived from the opposing molecular forces of cohesion and heat, that of the oscillative pendulum from the opposing forces of gravitation and revolution, and these inanimate governing mediums are adapted for resilient reaction upon either side of their planes of static equilibrium, so that, when forcibly deflected to either side thereof, they will return automatically to their inherent static state. Hence we may conclude that upon the occurrence of an unconscious state in the animal organism, the medium of conscious sensibility has arrived at its mediate point of static equilibrium, with a resulting state of unconsciousness.

Figure 1:
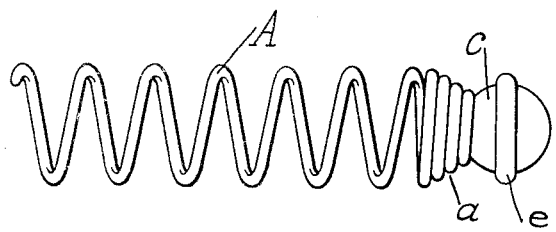
Figure 3:
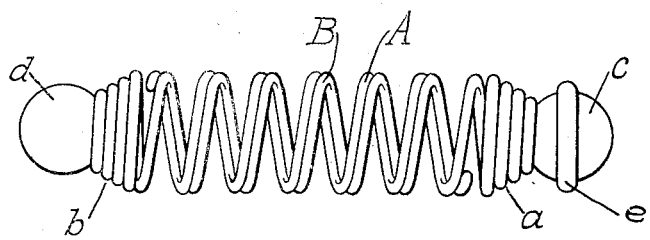

In the accompanying drawing; Figure 1 represents the side view of an elongated spiral spring; Fig. 2 represents the side view of a shorter spiral spring; Fig. 3 represents the intertwined combination of the two springs; and Figs. 4 and 5, represent the resulting changed condition of the intertwined springs, relatively to each other, when subjected to an increased degree of axial compression.

In accordance with this doctrine of mechanical conscious sensibility, a state of consciousness in the governing member of an animal organism, may be schematically represented by the resilient action of the spiral spring B, shown in Fig. 2, in which figure the spring is represented in its normal state of insensible molecular equilibrium, but when such a spring is placed under the strain of either compression or extension, a molecular sensibility of its changed condition will be developed therein, in terms of the occurring stress, by reason of which it is enabled to return automatically to its former insensible state. But while the stress of resiliency in a spring subjected to external influences may truly constitute a mechanical representation of that form of consciousness that accompanies sensation, and is conditioned upon the direct action of an external energy upon a resilient medium of conscious sensibility, yet a state of subconsciousness that is unconditioned, and not dependent upon external energies is required for the proper development of the physical functions of the organic enginery, and this latter form of consciousness may be schematically represented by means of the axially intertwined spiral springs A and B, which are made of equal diameter, and of the same size and quality of wire, but with the space between the coils of the spring A made greater than that between the coils of the spring B, as by forcibly spreading the said coils to a point beyond their co-efficient of elasticity from an original length equal to that of the spring B. These two springs are then to be screwed together longitudinally, so that the coils of the one will intertwine side by side with the coils of the other, with the axes of the two springs coincident, as shown in Fig. 3. Then through the resulting extension of the coils of the shorter spring B, and the drawing in of the coils of the longer spring A, a permanent state of stress will have been produced in each of the intertwined springs. The inherently shorter spring B now becomes an adverse reactive factor, serving to intensify the resiliency of the inherently longer spring A with which it is connected, while the molecular stress caused by the mutual antagonism of the two springs will serve to maintain in each a constant and unceasing state of molecular stress and sensibility.

The end $a$ of the spring A, and the end $b$ of the spring B, are preferably coiled down in conical form and each provided with an attached knob, as $c$ and $d$, or other means for the convenient application of external energy to the springs in order to develop their resilient action; and the knob $c$ of the spring A may be provided with an annular enlargement $e$, whereby the specific identity of the two springs may be readily recognized.

Figure 4:
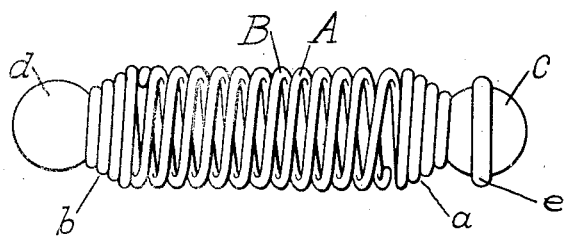
Figure 5:
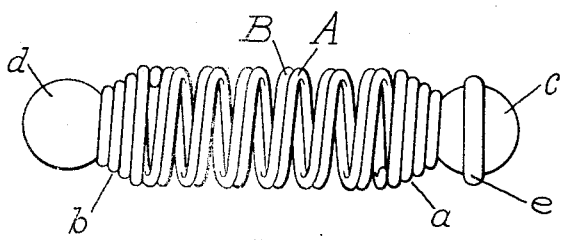

That molecular stress and consequent sensibility, will exist in the supreme controlling spring A, under all conditions of compression, while the stress and sensibility of the spring B will be decreased, and may be entirely removed, will be readily understood upon inspection of Figs. 4 and 5, where it is seen that when the spring A is forcibly compressed to the extent shown in Fig. 4, the adverse spring B will, by the effect of its own resilience, arrive at its mediate state of static insensible equilibrium, in which, it is released from the action of the controlling spring A, while at the same time the spring A is by reason of its increased compression, in a state of greater molecular stress than before. And if the forcible compression of the spring A is still further increased, as shown in Fig. 5, then the coils of the controlling spring A will pass over to the side of the adverse spring B.

The stress of molecular sensibility in the spiral spring B, which has a zero point of insensible equilibrium to which it returns automatically when relieved from the force of an external energy, constitutes an illustrative analogue, of the stress of conscious sensibility that exists in the governing member of an animal organism; which also, has a zero point of insensible equilibrium to which it returns when relieved from the action of an external energy. And the permanently abiding stress of molecular sensibility, that exists in the combined springs, A and B, which integral combination does not have a zero point of insensible equilibrium, constitutes an illustrative analogue of the unceasing conscious sensibility of the promoting member of an animal organism, which also, does not have a zero point of insensible equilibrium.

This schematic device also provides an educational emblem of the conscious relation that must exist between the co-extensive dispensing mediums for beneficence and maleficence, in the terrestrial factory; and it clearly indicates that the attribute of maleficence, which is ascribed to the realm of the adverse medium, may, under certain changed conditions, be made subject to decrease, and to a change in its relative action; while the attribute of beneficence, which pertains to the realm of the controlling supreme governor, is unconditioned, unchangeable and everlasting.

Now, in order to establish the fact that a proper educational emblem of the idea of everlasting conscious sensibility may be constructed of material elements; it may be stated that, there was a time in the history of the earth when organic life did not exist, hence the primordial molecular organization endowed with life must have been the fabricated product of certain coacting energies in the terrestrial environment; and while the various possible combinations of molecular matter could not produce life, it might be mechanically produced upon the earth by the combination of a mechanism composed of stable sensive elements, with a complementary mechanism composed of unstable molecular elements, the field of energy pertaining to the one mechanism being separate and distinct from the field of energy pertaining to the other.

When the inherently stable governing pendulum of a clock is removed from the unstable dynamic enginery, the pendulum will be capable of oscillation in the same intervals of time as before, whenever the resulting condition of static equilibrium is disturbed by the action of suitable external forces in the environment. But the stored power of the dynamic enginery will, in this case, soon be expended by the rapid downward movement of the actuating weight without useful effect, the hands of the clock having by the removal of the governing pendulum, been rendered incapable of indicating standard intervals of time; and no amount of rewinding will restore to the enginery its former time-keeping movement. Hence, we may conclude from mechanical analogy that, the primordial molecular organization having the function of life, was a result of the combination of two contemporaneous separate and distinct primary mechanisms, the one formed of stable sensive elements, and the other of unstable molecular elements, the stable mechanism serving as a regulating governor of the unstable, and the unstable, as a means for imparting fabricative activity to the stable mechanism.

The metals, copper and zinc, employed in the composition of brass, are when pure soft and inelastic like lead; but have different degrees of contractility from their molten state; so that, when melted together in proper proportions and allowed to cool in a mold, a permanent state of molecular stress and resiliency will be developed therein; which resulting molecular stress and resiliency may be increased by the process of hammering or rolling. And from the metal alloy so prepared, springs can be formed, which may be adapted for use, either as a reservoir of energy; as a governor and regulator of mechanical movement; or as an indicator of the specific value of external energies. Now, when we consider that sentient organic life is primarily introduced into the terrestrial factory, by the blending together of certain dissimilar sensive and molecular elements, and that the unceasing stress and sensibility of our schematic device, is the result of the melting together of certain dissimilar metals and the intertwining of certain antagonistic spiral springs formed therefrom; it becomes evident, that the said intertwined spiral springs provide a suitable educational emblem, of the idea of an everlasting conscious sensibility.

I claim as my invention:

An illustrative educational device, which consists in two axially intertwined spiral springs of substantially the same size and quality of wire, one of the said springs having the distance between its coils made inherently greater than that of the other, so that, when the said springs have been axially intertwined, the shorter spring will be extended and the longer spring contracted with an intervening space between the unengaged sides of the said coils, which space provides for the axial compression of the said intertwined springs, and end means adapted for the convenient manipulation of the said springs.

SOCRATES SCHOLFIELD.

Witnesses:
CHAS. E. SMITH,
COLIN M. HOLMES.